United States Patent [19]

Hasegawa

[11] Patent Number: 4,814,948

[45] Date of Patent: Mar. 21, 1989

[54] LIGHT-EMITTING-END MOUNTING MECHANISM IN OPTICAL DISPLAY PANEL

[76] Inventor: Yasuo Hasegawa, c/o Koken Co., Ltd., 215-1, Shimomagari, Ritto-cho, Kurita-gun, Shiga-Pref., Japan

[21] Appl. No.: 69,295

[22] Filed: Jul. 2, 1987

[51] Int. Cl.[4] ............................ G02B 6/36; G02B 7/02
[52] U.S. Cl. ...................................... 362/32; 362/455; 350/96.2
[58] Field of Search .................. 362/32, 382, 455; 350/96.2

[56] References Cited

U.S. PATENT DOCUMENTS

| 3,813,514 | 5/1974 | Canty | 362/32 X |
| 4,285,572 | 8/1981 | Beaudette et al. | 350/96.2 |
| 4,674,831 | 6/1987 | Bagby | 350/96.2 |

FOREIGN PATENT DOCUMENTS

| 2654653 | 8/1978 | Fed. Rep. of Germany | 350/96.2 |
| 56-161505 | 12/1981 | Japan | 350/96.2 |
| 60-173513 | 9/1985 | Japan | 350/96.2 |
| 61-114213 | 5/1986 | Japan | 350/96.2 |

OTHER PUBLICATIONS

IBM Technical Bulletin (U.S.A.), vol. 14, No. 3, Aug. 1971.

Primary Examiner—Tony M. Argenbright
Assistant Examiner—Eric R. Carlberg
Attorney, Agent, or Firm—Price, Gess & Ubell

[57] ABSTRACT

A mounting mechanism is provided for the light-discharging-end portion of an optical fiber onto an optical display panel wherein the fiber end is disposed within a threaded body that is inserted through the display panel and held in place by a nut. Alternatively, the nut can be formed of transparent light-diffusing material and configured to completely enclose the end of the thread body that projects out beyond the display panel to diffuse the light emanating therefrom.

3 Claims, 1 Drawing Sheet

LIGHT-EMITTING-END MOUNTING MECHANISM IN OPTICAL DISPLAY PANEL

BACKGROUND OF INVENTION

1. Field of the Invention

This invention relates to an optical display panel system using optical fibers, particularly to the light-emitting-end mounting mechanism in said optical display panel system wherein the light-emitting end portions can be readily mounted through an optical display panel.

2. Description of Prior Art

Optical display panel systems of the general type have been constructed of a light source, a bundle of optical fibers consisting of a large number of optical fiber elements which are bound together at one end to form a light-receiving end and are arbitrarily scattered at the other end to form an array of light-discharging ends, and an optical display panel body used to support each of the light-discharging ends in said bundle of optical fibers. Concerning optical display panels of this type, on the other hand, processes have been developed for mounting a light diffusing means onto each of the light-discharging-end portions of optical fibers so as to diffuse the rays of light transmitted from the light-discharging ends of the optical fibers, unaffected by directivity and in wider angles. In such optical panel systems wherein a light diffusing means is attached to each of the light-discharging end portions of the optical fibers, said light-emitting ends of the optical fibers must be coupled to an optical panel body. If it is desired to mount the light-emitting ends of optical fibers through the optical display panel, it has traditionally been required to insert the light-discharging end of an optical fiber into the mounting hole in an optical display panel from therebehind and caulking the space between said mounting hole and the circumference of the optical fiber. On the other hand, in optical display panel systems wherein said light-diffusing means is mounted, the light-discharging ends are allowed to project beyond the surface of the optical display panel body, and the optical fibers are secured into the optical display panel body, with said light-diffusing means being securely attached onto said projected portions of the light-discharging ends. As will be seen from the ways in which optical fibers are utilized, in neither of the aforestated cases, the light-diffusing means can be adhered in advance, and hence these schemes were both exceedingly unreasonable in that painstaking adhesion work was involved in the construction of such optical display panel system.

SUMMARY OF THE INVENTION

It is therefore a general object of the invention to provide the light-emitting-end mounting mechanism for an optical display panel utilizing optical fibers, wherein the operation of inserting, through an optical display panel from the back to the front sides, and adhering therein each of the light-discharging ends of the optical fibers bound together at one end, through an optical display panel thereof, or the operation to mount a light-diffusing means onto each of the light-discharging ends of the optical fibers after the completion of such adhesion thereof in the optical display panel, can be very simply accomplished without a special burden being imposed on the user.

The present invention relates to a light-emitting-end mounting mechanism for an optical display panel system comprising at least one light source, a bundle of numerous optical fibers which are bound together at one end to form a light-receiving end against said light source and which are arbitrarily scattered at the other end to form a large number of light-discharging ends, and an optical display panel provided to support each of the light-discharging ends of said bundle of optical fibers so as to trace the desired pattern, each of said light-discharging ends of the optical fibers being inserted through said optical display panel via a mounting hole therein, from the back to the front sides thereof, such that it juts out from the front surface of said panel body, wherein the mounting means to secure each of the light-discharging ends through said optical display panel body comprises a thread means having a head portion provided at one end, a threaded portion axially extending from the head and a nut element to be screwed onto the thread means of said thread body, said thread body being provided with an optical fiber receiving hole which runs axially therethrough and being removably mounted to the light-discharging side of said optical fibers through said receiving hole, the threaded portion of said thread body capable of being screwed into a mounting hole provided on said optical display panel, and said light-discharging ends of the optical fibers being mounted into said optical display panel body by screwing the nut element onto said threaded portion of the thread body during such operation.

Figure 1:
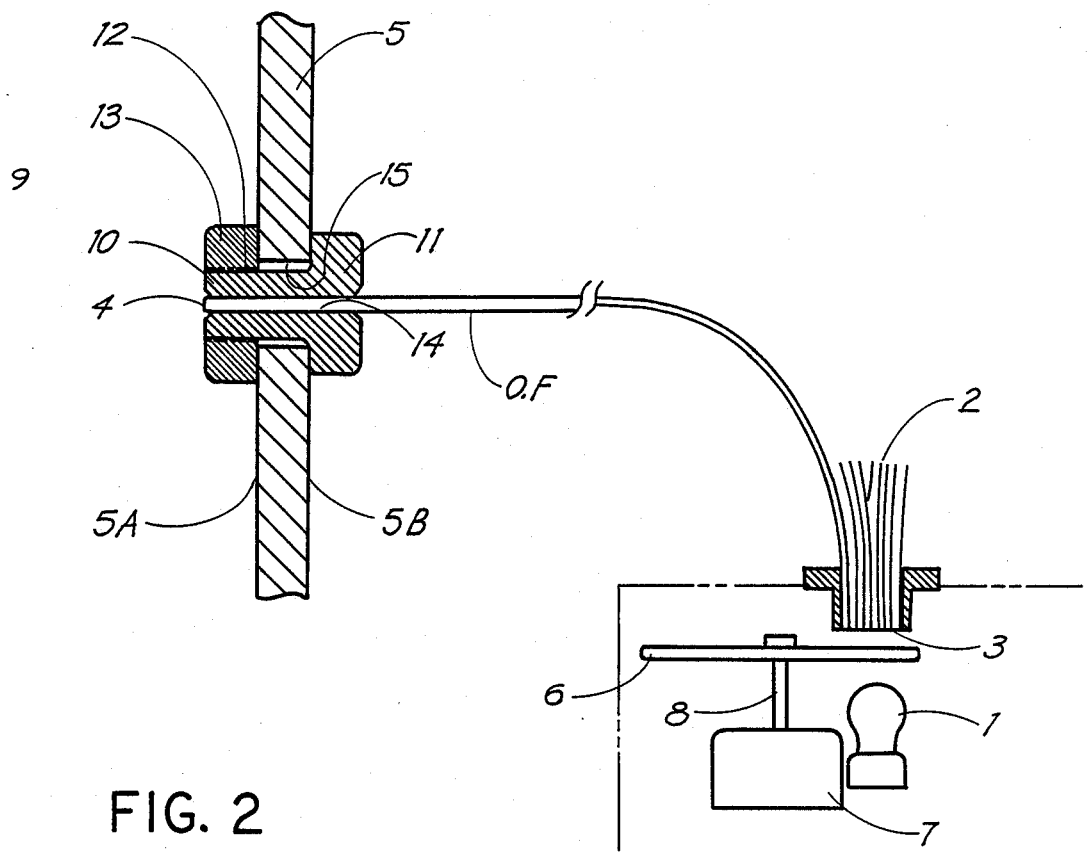
FIG. 1 comprises a partially enlarged schematic sectional side elevation of the fundamental construction of this invention.

(1) - Light source
(2) - Bundle of optical fibers
(3) - Light-receiving end
(4) - Light-discharging end
(5) - Optical display panel body
(9) - Mounting means
(10) - Thread body
(12) - Threaded portion
(13) - Nut element
(14) - Optical fiber receiving hole
(15) - Mounting hole
(16) - Light-diffusing means
(17) - Threaded hole
(18) - Surface onto which light is diffused and emitted
(20) - Particulate matters

DESCRIPTION OF THE PREFERRED EMBODIMENTS

Figure 2:
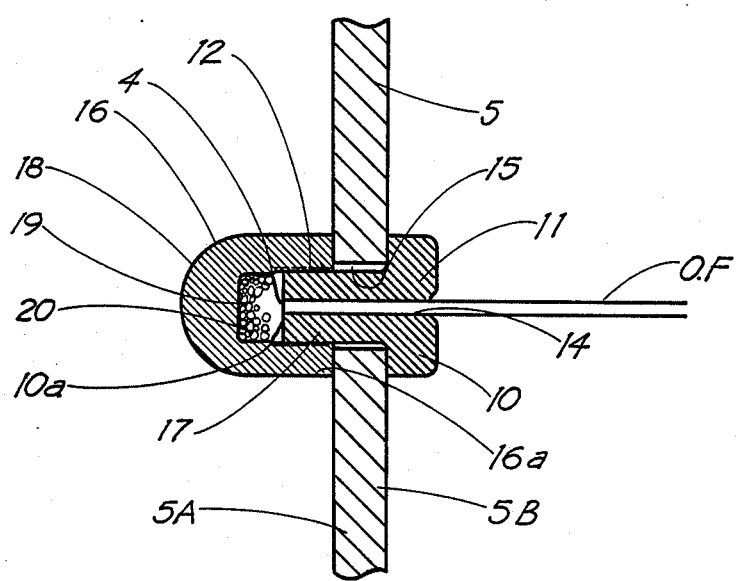
FIG. 2 comprises a schematic sectional side elevation of a modified version of a nut element.

Referring to the preferred embodiment of the light-discharging-end mounting mechanism of this invention shown in the drawings, FIG. 1 illustrates a schematic sectional side elevation of the basic construction of an optical display panel system embodying this invention. The optical display panel system according to this invention comprises a light source 1, a bundle of optical fibers 2 composed of a large number of optical fiber elements (O, F) which are bound together at one end to form a light-receiving end 3, and which are arbitrarily scattered at the other end to form a light-discharging end 4, and an optical display panel body 5 provided to support each of the light-discharging ends 4 of said bundle of optical fibers 2. In said optical display panel system, a filter 6 which turns or moves across a light incidence path is provided between the light source 1 and the light-receiving ends of the bundle of optical fibers 2. Said filter 6 is, for instance, a rotary-type multiple-color filter mounted through a rotary axis 8 to a rotary driving source 7. In the present invention, a mechanism provided to secure each of the light-discharging ends 4 of said bundle of optical fibers 2 into said optical display panel body 5 includes a mounting means 9. Said mounting means 9 comprises a thread body 10 having a head portion provided at one end, a threaded portion 12 axially extending from said head, and a nut element 13 to be screwed onto the threaded portion 12 of said thread body 10. Said thread body 10 has an optical fiber receiving hole 14 which axially runs therethrough. The internal diameter of said optical fiber receiving hole 14 is practically the same as the external diameter of said optical fiber elements (O, F). Each of said light-discharging ends 4 of the optical fibers are to be press-fit into the optical fiber receiving hole 14 of said thread body 10, and may be adhered as necessary while being inserted into the hole. Said optical display panel body 5 has a mounting hole suitable for receiving the threaded portion 12 of said thread body. In the case of the embodiment of such construction, when optical fiber elements (O, F) are bound together at one end and provided as a bundle of optical fibers 2, the thread body 10 is first inserted into each of the light-discharging ends 4 of said optical fiber elements (O, F) from the head 11 thereof. The thread body 10 inserted into the light-discharging end 4 is put into the mounting hole 15 in said optical display panel body 5, from the back surface 5B to the front surface 5A thereof. After such insertion, the nut element 15 is screwed on, from the front surface 5A of said optical panel body 5, onto the threaded portion 12 of the thread body 10 extending beyond the front surface of said optical panel body 5 and hence the light-discharging end 4 of said optical fiber element (O, F) is secured in said optical display panel body 5. On the other hand, FIG. 2 shows a modification of this invention, particularly the transformed version of said nut element 13. Said transformed nut element comprises a light-diffusing means 16. Said light-diffusing means 16 is moulded of, for instance, highly transparent plastics such as acrylic synthetic resins. Said light-diffusing means 16 has a threaded hole 17 to be mated with the threaded portion 12 of said thread body 10 at one end, and a light-diffusing and -emitting surface at the other end. Said threaded hole 17 extends from the end face 16a of said light-diffusing means 16 to said light-diffusing and -emitting surface 18, and terminates as a floor 19 inside the light-diffusing means 16. The depth of said optical display panel body is designed such that when said light-diffusing means 10 is screwed onto said thread body 10 through optical display panel body 5, a space is created between the forward end 10a of said thread body 10 and the floor 19 of said threaded hole 17. Housed into the threaded hole of said light-diffusing and -emitting means 16 are transparent particulate matters 20 for light diffusion. Said particulate matters 20 are formed of, for example, single-crystal calcium fluoride ($CaF_2$). Said particulate matters 20 posses high transparency and refractive index, and should have 20 to 30 meshes. After said particulate matters 20 are introduced into the threaded hole of said light-diffusing means 16, metylene chloride is added to partially melt the wall of the threaded hole 17 of said light-diffusing means 16 made of acrylic resin, thereby securing the particulate matter 20.

The light-discharging-end mounting mechanism in the optical display panel system of this invention which has the aforestated construction can be fabricated by very simple screwing-in operations without any special adhesion work when each of the light-discharging ends of the optical fibers bound together at one end beforehand is mounted through an optical display panel. In this sense, it is safe to state that such mechanism is effective in achieving the improved workability. Furthermore, the light-discharging-end mounting mechanism of this invention is suited to volume production and offers marked economical benefits, since the forming and other processes of the light-receiving end of an optical fiber can be accomplished at a factory. The light-discharging-end mounting mechanism of the present invention can be utilized as a flexible optical display panel system, since to change the original design of the first embodiment, it is only required to apply light-diffusing means onto a nut element, and a light-discharging-end of an optical fiber with high directivity results that it can emanate rays of light unaffected by directivity and in wider angles.

What I claim is:

1. An optical fiber light-discharging-end mounting mechanism comprising:
    a tubular thread body having a head of increased cross-section on one end and an externally threaded portion on the other end;
    an optical fiber receiving hole axially disposed within the thread body into which the light-discharging-end of an optical fiber is inserted from the head end of the thread body;
    a display panel having a receiving hole therethrough through which the threaded end of the thread body is inserted, and
    a nut element assembly that is screwed onto the threaded end of the thread body to secure the thread body to the display panel, including a transparent light-diffusing member, internally threaded to receive the threaded portion of the thread body and configured to completely enclose the threaded portion of the thread body.

2. The optical fiber light-discharging-end mounting mechanism of claim 6, wherein the transparent light-diffusing member has light-diffusing particulate matter disposed on its inside surface.

3. A light-discharging-end mounting mechanism for an optical display panel system comprising at least one light source, a bundle of optical fibers which are bound together at one end to form a light-receiving end opposed to said light source and which are positioned at the other end to form a large number of light-discharging ends, an optical display panel body provided to support each of the light-discharging ends of said bundle of optical fibers, each of the light-discharging ends of said optical fibers being inserted, from the back to the front surface of said optical display panel, and secured therein through a mounting hole provided therein so that each of the light-discharging ends juts out beyond the front surface of the panel body, wherein the mounting means to secure each of the light-discharging ends through said optical display panel body comprises a thread means having a head provided at one end, a threaded portion axially extending from the head and a nut element to be screwed onto the thread means of said thread body, said thread body being provided with an optical fiber receiving hole which runs axially therethrough and being removably mounted to the light-discharging side of said optical fibers through said receiving hole, the threaded portion of said thread body capable of being screwed into the mounting hole provided on said optical display panel, and said light-discharging ends of the optical fibers being mounted into said optical display panel body by screwing the nut element onto said threaded portion of the thread body upon such insertion, and a transparent light-diffusing means having, at one end, a threaded hole into which the thread portion of said thread body is to be screwed, and having a light-diffusing and -emitting surface at the other end, with particulate matters being securely disposed within the light-diffusing means.

* * * * *